United States Patent
Coshow

[15] 3,666,197
[45] May 30, 1972

[54] DEPTH GAUGING MEANS FOR FISHING REELS

[72] Inventor: Chester L. Coshow, P.O. Box 149, Collinsville, Okla. 74021

[22] Filed: Apr. 20, 1970

[21] Appl. No.: 29,809

Related U.S. Application Data

[63] Continuation-in-part of Ser. No. 822,463, May 7, 1969, Pat. No. 3,563,489.

[52] U.S. Cl. .................................. 242/84.1 R, 242/84.2 R
[51] Int. Cl. ........................................................ A01k 89/00
[58] Field of Search ................... 242/84.1 R, 84.1 K, 84.2 R, 242/84.2 A, 84.21 R, 100, 101, 106, 104, 128

[56] References Cited

UNITED STATES PATENTS

| | | | |
|---|---|---|---|
| 3,176,929 | 4/1965 | Britt | 242/84.1 R |
| 3,503,570 | 3/1970 | Coshow | 242/84.2 A |
| 3,085,765 | 4/1963 | Ulrich | 242/81.1 R |

*Primary Examiner*—Billy S. Taylor
*Attorney*—William S. Dorman

[57] ABSTRACT

A spool for fishing reels having line wound thereon and provided with metering means for paying-out predetermined lengths of the line. The spool comprises a peripheral surface upon which the line can be wound, and a gauge member movable between a first position removed from the region of said peripheral surface and a second position spacedly superposed with respect to said peripheral surface, said gauge member being removably retainable in either said first or second position whereby when in said second position line wound on the spool will be spaced above the peripheral surface in the region of said gauge member and supported by the latter in said region, the length of line subsequently payable from the spool when said gauge member is in the second position being limited to those line windings supported by said gauge member.

7 Claims, 8 Drawing Figures

PATENTED MAY 30 1972 3,666,197

INVENTOR.
CHESTER L. COSHOW
BY
William S. Dorman
ATTORNEY

DEPTH GAUGING MEANS FOR FISHING REELS

This application is a continuation-in-part application of my co-pending application Ser. No. 822,463, filed May 7, 1969, and now U.S. Pat. No. 3,563,489, and entitled "Depth-Gauging Means for Fishing Reels."

This invention relates to improvements in fishing reels, casting reels, spinning reels and the like and more particularly, but not by way of limitation, to a spool member for fishing line including metering means for controlling the pay-out of predetermined lengths of line.

Whereas fishermen frequently find it desirable to fish at a certain depth, and to do so repeatedly each time the hook is dropped in a particular location, conventional fishing reels, being incapable of conveniently and automatically being gauged for the specific depth required, have been found unsatisfactory. Further, anglers desiring to cast to predetermined distances and to repeatedly accomplish such measured casts have been frustrated to this end, especially when a readjustment of a previously gauged distance becomes necessary. A depth gauging means for spinning reels has been developed for overcoming this disadvantage as shown in my prior U.S. Pat. Nos. 3,503,570, issued Mar. 31, 1970, and 3,465,962, issued Sept. 9, 1969, and both entitled "Spinning Reel Depth-Gauging Means." However, the problem is equally frustrating for the deep sea fisherman, who normally uses relatively large reels commonly known as level wind reels wherein the spool member having the line wound thereon rotates. There are also many fishermen who use reels known as open face fishing reels wherein the spool member is normally stationary, but may be rotated against a friction brake member under certain conditions during use. These large deep sea reels and open face reels present an additional problem when it is desired to drop a hook repeatedly into the water at substantially the same depth. In addition, many fishing reels are presently adapted for receiving pre-wound spool members which may be easily inserted or installed on the reel in order to provide greater versatility of use with a single reel. For example, a plurality of prewound spools having different weights of line wound thereon may be utilized selectively in a single reel by merely removing one spool and replacing it with another in accordance with the desired line weight for the particular fishing operation to be performed by the use of the reel. This adds to the problem of dropping a hook repeatedly into the water at the same depth.

The present invention contemplates an improved depth gauging means for fishing reels which is particularly designed and constructed for overcoming the above disadvantages. The novel gauge means comprises a shaft or rod member which may be readily selectively inserted in the spool member of an open face type fishing reel, or the large deep sea reels when it is desired to control the pay-out of the line from the reel. The gauge member may be readily removed or repositioned on the spool member for altering the length of the line to be paid out, but subsequently retaining or controlling the pay-out at the same length until it is necessary or desirable to again alter the pay-out length of the line. In addition, the gauge member may be carried by the removable or independent type prewound spool member for altering or controlling the paying out of the line therefrom. The gauge member is spaced from the peripheral surface of the spool and extends substantially parallel with respect thereto whereby the subsequent line portion wound on the spool will pass over the gauge member in order that the hook, regardless of the number of time reeled in and re-dropped, will sink precisely to the originally gauged depth, readjustment of the setting or the absolute elimination of any setting being readily effectuated.

It is an important object of this invention to provide a novel depth gauging means for fishing reels which may be quickly and easily installed on substantially any fishing reel for controlling the length of line payout therefrom.

It is another object of this invention to provide a novel depth gauging means for fishing reels which may be quickly and easily installed on the spool of the reel whether the spool is stationary or revolvable.

Another object of this invention is to provide a novel depth gauging means for fishing reels which may be readily removed and replaced on the reel in order to alter the length of the line being gauged thereby.

Still another object of this invention is to provide a novel depth gauging means for fishing reels which may be carried by a removable spool, for increasing the flexibility of use of a single fishing reel.

Still another object of this invention is to provide a novel depth gauging means for fishing reels which is simple and efficient in operation and economical and durable in construction.

Other and further objects and advantageous features of the present invention will hereinafter more fully appear in connection with a detailed description of the drawings in which.

Figure 3:
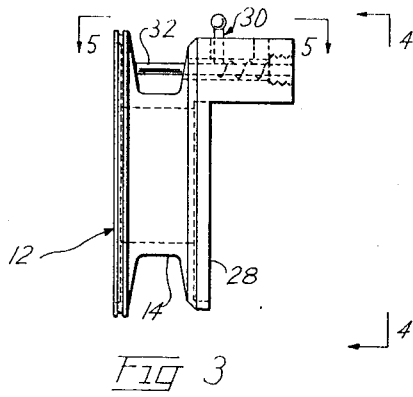
FIG. 3 is a side elevational view of a spool for fishing reel and having a modified depth gauging means embodying the invention provided thereon.
Figure 4:
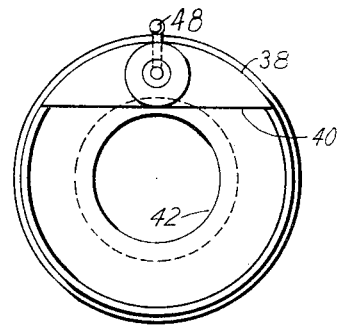
FIG. 4 is a view taken on line 4—4 of FIG. 3.
Figure 5:
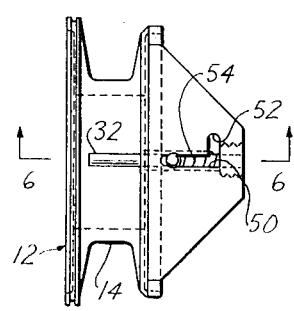
FIG. 5 is a view taken on line 5—5 of FIG. 3.
Figure 6:
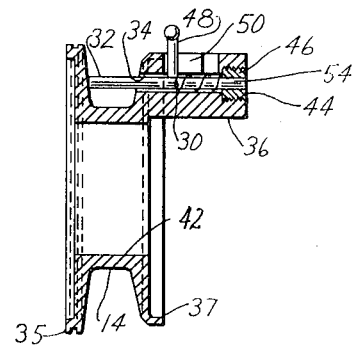
FIG. 6 is a view taken on line 6—6 of FIG. 5.

Referring to the drawings in detail, reference character 10 generally indicates an open face fishing reel of any suitable type. As depicted herein the reel 10 comprises a spool 12 having a peripheral surface 14 for receiving the usual line (not shown) thereon as is well known. The spool 12 is preferably independent from or removable from the reel 10, and may be prewound with any desired weight line. A revolvable member 16 is provided adjacent the spool 12 and is provided with a line engaging level winding bail member 18 rotatable simultaneously therewith for a purpose as will be hereinafter set forth. The spool 12 and revolvable member 16 are suitably mounted on or secured to a housing or casing 20 which includes a mounting member 22 for securing the reel 10 to a fishing pole, or the like (not shown). A suitable gear train or gear mechanism (not shown) is normally disposed within the housing 20 and is operably connected through a rotatable handle or crank member generally indicated at 24 for rotation thereby as is well known. The revolvable member 16 is operably connected with the gear mechanism whereby rotation of the handle 24 causes the rotatable member 16 and bail member 18 to rotate. The spool member 12 is preferably removably secured in position and is operably connected with the gear mechanism for longitudinal reciprocation simultaneously during the rotation of the member 16. In addition, a suitable friction brake member 26 is threadedly or otherwise secured adjacent the outer or exposed surface or end 28 of the spool 12 for frictional engagement therewith whereby the normally nonrotatable spool 12 may be selectively rotated against the frictional force of the member 26 in a manner and for a purpose as will be hereinafter set forth.

In operation of the reel 10, the line (not shown) is suitably wound around the peripheral surface 14 of the spool 12 in the usual manner. Manual turning of the handle or crank 24 rotates the member 16 in one direction for causing the line to wind onto the spool 12. Rotation of the member 16 in an opposite direction permits paying out or unwinding of the line from the spool 12, all as is well known. In the event that the line becomes taut for any reason, such as upon catching a fish or becoming entangled, the spool 12 will rotate from the pull force of the line when the force of the line exceeds the force of the friction brake member 26 against the end 28 of the spool 12.

When it is desired to pay out a predetermined or preselected length of line from the spool 12 during each operation of the reel 10, a gauge member generally indicated at 30 may be utilized in a manner as will be hereinafter set forth in detail. Referring particularly to FIGS. 3 through 6, the gauge member 30 comprises a rod or shaft member 32 slidably disposed in a bore 34 provided in a housing portion 36. The spool 12 is usually provided with oppositely disposed circumferential end flanges 35 and 37 and the housing 36 extends axially from one of the flanges, such as the flange 37, and may be integral therewith or secured thereto in any suitable manner. The cross-sectional configuration of the housing 36 is a segment of a circle whereby one surface 38 thereof is arcuate complementary to the outer periphery of the spool 12, and the other surface 40 thereof is substantially straight and disposed in an out-of-the-way position with respect to the central bore 42 of the spool, thus precluding interference with the normal operation thereof.

The bore 34 is provided with an enlarged threaded portion 44 at the outer end thereof for receiving a threaded bushing member 46 therein. The rod 32 extends slidably through the bushing 46 and the bushing provides an annular shoulder therearound for a purpose as will be hereinafter set forth. A handle or shank member 48 is threadedly or otherwise secured to the rod 32 and extends radially outwardly therefrom through a slot 50 provided in the housing 44 in communication with the bore 34. The slot 50 is preferably substantially L-shaped as particularly shown in FIG. 5, with the short leg 52 thereof being disposed in the proximity of the inward end of the bushing 46. A suitable helical spring 54 is disposed around the rod 32 and interposed between the arm 48 and the annular shoulder formed around the rod 32 by the bushing 46. The force of the spring 54 constantly urges the rod 32 in a left hand direction as viewed in the drawings whereby the rod 32 normally extends between the flanges 35 and 37 substantially parallel with the peripheral surface 14 and in spaced relationship with respect thereto. When it is desired to remove the rod 32 from the position extending between the flanges 35 and 37 the handle or arm 48 may be manually grasped and moved in a direction against the force of the spring 54 thus moving the rod 32 in a right hand direction as viewed in the drawings. The arm 48 may be moved into the slot portion 52 for locking the rod 32 in the right hand position.

When the rod 32 is locked in the right hand position, or retracted position, the spool 12 may be utilized in the normal manner for the winding and rewinding of the line on the peripheral surface 14 thereof. When it is desired to pay out a predetermined length of the line from the spool during each operation of the reel 10, the rod member 32 is released from the retracted position by moving the arm 48 out of the slot portion 52. The spring 54 will then move the rod 32 in a left hand direction to the position thereof extending between the flanges 35 and 37 as hereinbefore set forth. Subsequent to the "setting" of the rod 32 upon rewinding of the line on the spool 12, the line will wind around a portion of the peripheral surface 14 and over the outer surface of the rod member 32 and all subsequent operations of paying out of the line will result in only that length of line so wound over the rod 32 and peripheral surface 14. Thus, an identical length of line can be repeatedly payed out from the spool 12. The rod 32 may be readily retracted and reset when it is desired to alter the predetermined or preselected length of line to be payed out from the spool 12.

Figure 2:
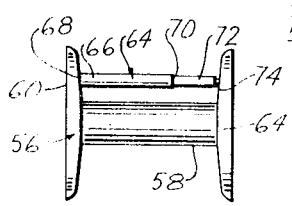
FIG. 2 is a side elevational view of a spool for a fishing reel and having a depth gauging means embodying the invention provided thereon.

Referring to FIG. 2, a spool 56 is shown therein which comprises a substantially cylindrical peripheral surface 58 for receiving the line wound therearound. The spool member 56 is provided with oppositely disposed circumferential end flanges 60 and 62 which facilitate the winding of the line on the peripheral surface 58 and substantially preclude accidental loss of the line from the spool. A modified gauge member generally indicated at 64 may be readily inserted in the spool 56 and extends between the flanges 60 and 62 in such a manner as to be spaced from and substantially parallel to the peripheral surface 58. Subsequent to the installation of the gauge member 64 on the spool 56 upon rewinding of the line on the spool 56 the line will wind around a portion of the peripheral surface 58 and over the outer surface of the gauge 64 and all subsequent operations of paying out of the line will result in only that length of line so wound over the gauge 64 and peripheral surface 58. Thus, an identical length of line can be repeatedly payed out from the spool 58.

In order to provide for variable positions for the gauge 64 with respect to the peripheral surface 58 a plurality of radially spaced apertures (not shown) are provided on the inwardly directed surfaces of each flange 60 and 62, with the respective apertures being disposed in substantially axial alignment. The gauge member 64 may be readily installed or inserted between the particular selected aligned pairs of apertures in a manner as will be hereinafter set forth in order to achieve the desired length of payout of the line.

The gauge 64 comprises an elongated shaft or sleeve member 66 of a length less than the distance between the end flanges 60 and 62. One end 68 of the sleeve 66 is closed and a reduced finger member (not shown) extends axially outward therefrom. The opposite end 70 of the sleeve 66 is open for slidably receiving a reciprocal rod 72 therein. A suitable helical spring (not shown) is disposed within the sleeve 66 and interposed between the closed end 68 thereof and the rod 72 for constantly urging the rod 72 in an axial direction away from the closed end 68. Of course, suitable means (not shown) is provided for cooperating between the rod 72 and sleeve 66 for precluding accidental separation of the rod 72 from the sleeve, such as a bayonet type connection, or complementary shoulder means, or the like, as is well known. A reduced finger 74 similar to the reduced finger on the closed end 68 is provided on the outer end of the rod 72 and extends axially outward therefrom. The fingers are of a size for insertion within a complementary pair of the aligned bores (not shown) provided on the inwardly directed faces of the flanges 60 and 62 for facilitating installation of the gauge 64 within the spool 56.

In order to install the gauge 64 in the spool 56, the gauge 64 may be manually grasped in any well known manner, and the finger 74 may be inserted in the desired or appropriate aperture of one of the flanges, such as the flange 62. The sleeve 66 may be moved longitudinally with respect to the rod 72 and against the force of the spring (not shown) through a sufficient distance whereby the finger (not shown) on the closed end 68 will clear the inwardly directed surface of the opposite flange 60, and the said finger may be inserted in the axially aligned aperture of the flange 60. The spring member will urge the end portions of the gauge 64 into secure engagement with the inwardly directed faces of the flanges 60 and 62 for retaining the gauge 64 in position therebetween until it is desired to alter the position thereof.

When it becomes necessary or desirable to alter the position of the gauge 64 for any reason, the gauge may be manually grasped in any well known manner, and the sleeve 66 moved longitudinally with respect to the rod 72 and against the force of the spring (not shown) through a sufficient distance for removing the finger of the closed end 68 from engagement with the respective aperture of the flange 60. This releases one end of the gauge 64 from connection with the spool 56, and the finger 74 may then be readily removed from the respective aperture of the flange 62. The gauge may then be reinstalled in the spool 56 by placing the fingers in a second pair of aligned apertures in the flanges 60 and 62 in the manner as hereinbefore set forth. Of course, if it is not required to use the gauge, the device may be temporarily removed from the spool 56 until such a time as the use thereof is again required.

Figures 1, 7, 8:
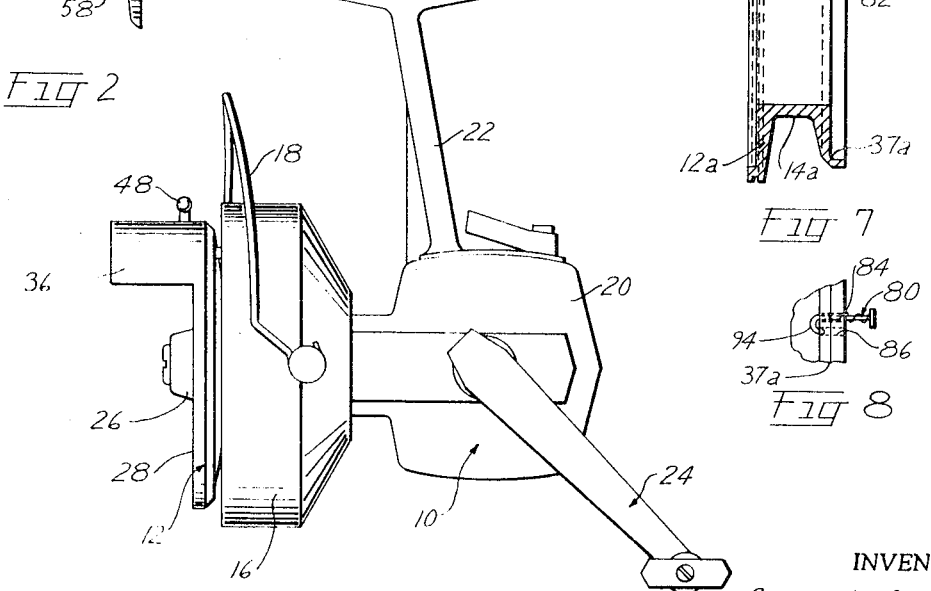
FIG. 1 is a side elevational view of an open face spinning reel having a depth gauge embodying the invention provided thereon.
FIG. 7 is a view similar to FIG. 6 depicting still another modified depth gauging means embodying the invention.
FIG. 8 is a view taken on line 8—8 of FIG. 7.

Referring now to FIGS. 7 and 8, a modified gauge 80 is shown installed on a spool 12a generally similar to the spool 12. The spool 12a is provided with a peripheral surface 14a for receiving the line (not shown) to be wound thereon. In addition, a pair of oppositely disposed end flanges 35a and 37a are provided on the spool 12a for precluding accidental loss of the line from the peripheral surface 14a. A circumferential portion of one of the flanges, as the flange 37a, is enlarged as shown at 82 in FIG. 7, and is provided with a pair of aligned spaced bores 84 and 86 extending therethrough. A pin member 88 is slidably disposed in one of the bores, such as the bore 84. The outer end of the pin 88 is provided with a head member 90 and a helical spring 92 is interposed between the head 90 and the enlarged portion 82 for constantly urging the pin 92 in a direction toward the flange 37a. The inward end of the pin 88 is provided with an open hook member 94 adapted for engagement with the bore 86 as clearly shown in FIG. 8. It will be apparent that a recess (not shown) may be provided in the inwardly directed surface of the flange 37a, if desired, whereby the hook member 94 will not protrude into the area between the flanges 35a and 37a.

When it is desired to pay out consistent predetermined lengths of line from the spool 12a, the line (not shown) may be engaged by or passed through the hook 94 at the length which has been predetermined as the desired payout length. The spring member 92 holds the hook 94 in close engagement with the flange 37a for tightly pinching or gripping the line therebetween. In this manner, only the length of line beyond the gripping point of the line will be paid out upon repeated reeling and unreeling of the line, as hereinbefore set forth. When it is desired to alter the length of the line to be payed out, the hook may be moved away from the flange 37a by moving the pin 88 in a direction against the force of the spring 92, and a new engagement of the line at the altered length may be made by the hook 94.

As hereinbefore set forth, the current trend in the fish line industry is to provide reels or spools having the line spooled thereon, with the filled spool itself adapted for removable installation on a fishing reel. Of course, the spools 12, 12a and 56 may all be of the prefilled type and either the gauge 30, gauge 64 or gauge 80 may be utilized therewith.

From the foregoing it will be apparent that the present invention provides a novel gauge means for controlling the payout of a line from a fishing reel, or the like, whereby substantially the exact length of the line may be cast from the reel at each subsequent casting operation. The novel gauging means comprises an elongated shaft member which may be readily installed on the spool of a fishing reel and moved to alternate engaged or disengaged positions as needed. When the gauge member is in the engaged position thereof, an established length of the line is provided for the subsequent casting operation. When the gauge member is in the disengaged position the reel may be utilized in the normal manner. The novel gauge may be utilized with substantially any type of fishing reel, and particularly with a spool having the line prewound thereon.

Whereas the present invention has been described in particular relation to the drawings attached hereto, it should be understood that other and further modifications, apart from those shown or suggested herein, may be made within the spirit and scope of this invention.

What is claimed is:

1. In combination with a spool for fishing reels and having a peripheral surface for the reeling and unreeling of a line, gauge means carried by the spool and comprising contractable and extensible shaft means for establishing a predetermined length of line for repeated reeling and unreeling of a substantially constant length of the line, said spool having a bore therein for slidably receiving the shaft means therethrough, stop means cooperating with the shaft for retaining the shaft in the bore, spring means constantly urging the shaft into the position thereof for establishing said predetermined length of line, said shaft means movable against the force of the spring for releasing the line from the said predetermined length during reeling and unreeling operations, and including housing means carried by the spool and having said bore extending therethrough, said housing having an L-shaped slot in communication with the bore, said shaft means including an elongated rod member extending slidably through said bore, an arm member secured to the rod member and extending radially outwardly therefrom through the slot, said stop means including a bushing sleeve threadedly secured in one end of the bore, and said spring means is disposed around the rod member and interposed between the arm member and bushing for constantly urging the rod member into the extended position therefor, said arm member being movable against the force of the spring for moving the rod member to the contracted position therefor, and said arm member cooperating with the slot for temporarily locking the rod member in the said contracted position.

2. In combination with a spool for fishing reels and having a peripheral surface for the reeling and unreeling of a line, gauge means carried by the spool and comprising contractible and extensible shaft means for establishing a predetermined length of the line for repeated reeling and unreeling of a substantially constant length of the line, said spool having a bore therein for slidably receiving the shaft means therethrough, stop means cooperating with the shaft for retaining the shaft in the bore, spring means constantly urging the shaft into the position thereof for establishing said predetermined length of line, said shaft means movable against the force of the spring for releasing the line from the said predetermined length during reeling and unreeling operations, and wherein the shaft means includes a rod member slidably disposed in the bore, hook means provided on one end of the rod member for engaging the line to establish said predetermined length therefor, said stop means includes a head member provided on the opposite end of the rod member, said spring means being disposed around the rod member and interposed between the spool and the head member for constantly urging the rod member in a direction for engaging the hook means with the line, said rod member being movable against the force of the spring for releasing the hook means from engagement with the line.

3. In combination with a spool for fishing reels and having a peripheral surface for the reeling and unreeling of a line, gauge means as set forth in claim 2 wherein said spool is provided with second bore means for receiving the hook means therein in one position of the rod member for locking the hook means in the engaged position with the line.

4. In combination with a spool for fishing reels and having a peripheral surface for the reeling and unreeling of a line, gauge means carried by the spool and comprising an elongated contractible and extensible shaft member spaced from and substantially parallel to the said peripheral surface, a housing provided on the spool and extending axially outward therefrom, said housing having a bore therein for slidably receiving the shaft member therethrough, said housing being provided with slot means in communication with the bore, arm means secured to the shaft member and extending radially outwardly therefrom through the slot means, stop means provided in the bore, spring means disposed around the shaft member for constantly urging the shaft into the extended position therefor, said arm member being movable against the force of the spring for moving the shaft member to the contracted position therefor and cooperating with the slot means for temporarily locking the shaft member in the said contracted position.

5. In combination with a spool for fishing reels and having a peripheral surface for the reeling and unreeling of a line, gauge means as set forth in claim 4 wherein the slot means is of a substantially L-shaped configuration with the short leg thereof being disposed in the proximity of the stop means for receiving the arm member therein in the said locked position of the shaft member in the contracted position.

6. In combination with a spool for fishing reels and having a peripheral surface for the reeling and unreeling of a line, gauge means as set forth in claim 4 wherein the spring means is interposed between the stop means and the arm member.

7. In combination with a spool for fishing reels and having a peripheral surface for the reeling and unreeling of a line, gauge means comprising a rod member, said spool provided with first bore means for slidably receiving the rod member therethrough, hook means provided on one end of said rod member for alternately selectively engaging and gripping the line, head means provided on the opposite end of the rod member, spring means interposed between the head means and the spool for constantly urging the rod member in one direction for locking the hook means in the engaged gripping position of the line, said rod member being movable against the force of the spring for releasing the hook from the engaged position with the line.

* * * * *